United States Patent [19]

Peeters

[11] Patent Number: 5,199,252
[45] Date of Patent: Apr. 6, 1993

[54] WHEEL RAKE

[75] Inventor: Kenneth I. Peeters, Bear Creek, Wis.

[73] Assignee: H & S Manufacturing Co., Inc., Marshfield, Wis.

[21] Appl. No.: 679,723

[22] Filed: Apr. 3, 1991

[51] Int. Cl.$^5$ .................. A01D 57/12; A01D 67/00; A01D 78/14

[52] U.S. Cl. ...................... 56/377; 56/384; 56/DIG. 21

[58] Field of Search ............... 56/377, 376, 228, 341, 56/11.9, 367, 366, 365, 384, DIG. 21

[56] References Cited

U.S. PATENT DOCUMENTS

| | | | |
|---|---|---|---|
| 4,077,189 | 3/1978 | Hering | 56/377 X |
| 4,183,198 | 1/1980 | Sligter | 56/377 |
| 4,214,428 | 7/1980 | Caraway | 56/341 |
| 4,245,458 | 1/1981 | Smith | 56/376 |
| 4,496,003 | 1/1985 | Bynum | 56/377 |
| 4,723,401 | 2/1988 | Webster et al. | 56/377 |
| 4,932,197 | 6/1990 | Allen | 56/377 |
| 4,947,631 | 8/1990 | Kuehn | 56/377 |
| 4,974,407 | 12/1990 | Rowe et al. | 56/377 |

OTHER PUBLICATIONS

1 "Vicon" Brochure entitled Crop-Driven Finger-wheel Rakes.

*Primary Examiner*—Stephen J. Novosad
*Attorney, Agent, or Firm*—Patterson & Keough

[57] ABSTRACT

An agricultural rake especially designed for gathering wide swaths of agricultural field crops into windrows prior to baling is provided. The rake includes a primary frame, a pair of secondary rake frames pivotally and shiftably mounted to the primary frame, and a plurality or bank of radially-tined wheel rakes supported by the secondary frames. Both the angle of deployment of the secondary frames as well as the distance between the frames is adjustable to accommodate different swath widths and windrow sizes. A unique rake suspension assembly provides for the easy shifting of the rake bases between the raking and transport positions while providing for desired damping of the rakes during raking operations.

10 Claims, 9 Drawing Sheets

WHEEL RAKE

TECHNICAL FIELD

The subject invention relates to agricultural implements. In particular, it relates to a ground powered rake for gathering harvested crops into windows.

BACKGROUND OF THE INVENTION

A primary goal in the harvesting of hay is to dry the hay as soon as possible and remove it from direct exposure to sunlight. The hay must be dried before storage to avoid the problems of mold and spontaneous combustion. Exposing the cut hay to sunlight longer than is required to adequately dry it, however, results in unacceptable deterioration of the protein level (and therefore nutritive value) of the hay.

Typically, hay is harvested into approximately five foot swaths along the ground, and is exposed to sunlight for the initial stage of the drying process. The swaths of hay are then raked into narrow windrows to remove most of the hay from direct contact with the moist ground. The windrow enhances more air circulation within the hay, thereby hastening the drying process.

Rakes have long been used for forming swaths into windrows. Early rakes included relatively movable support frame members to control or adjust operational positions of the rake. Examples of such rake implements are disclosed in U.S. Pat. Nos. 2,925,702, 2,982,081 and 3,108,424.

Improvements in rake implements are disclosed in U.S. Pat. Nos. 4,077,189 (to Hering) and 4,245,458 (to Smith), disclosing plural rakes and telescoping adjustment structures for adjusting the width and size of windrows and the spacing of the rakes. The twin rakes disclosed in the patent to Hering include pivot hinges for the rake support structure to permit the rakes to float and to raise the outer end of the rakes into a transport position.

U.S. Pat. No. 4,723,401 (to Webster et al.) discloses a raking implement wherein a 4-bar linkage, including a hydraulically operated control link, enables an operator to steer wheels that support frame arms. A stabilizer mechanism is provided to limit the extent of pivotal movement of the frame arms. U.S. Pat. Nos. 4,183,198 (to Sligter) and 4,214,428 (to Caraway) disclose other rakes for forming single large windrows for baling hay into large roll-type bales. These rakes have a V-shape formed by two groups of rakes attached to a frame. The relative position of the groups may be varied.

U.S. Pat. No. 4,231,218 (issued to Delgado and assigned to Vicon España S.A.) discloses a rake for matching the unevenness and slopes of the ground. The rake has a wheeled main frame, a subframe formed by relatively independently pivotable arms fastened to the main frame, two board supports pivotally connected with the subframe, and rake boards arranged on the board supports.

Another improvement of the agricultural rake is represented by the Bi-Fold Hay Rake disclosed in U.S. Pat. No. 4,947,631 (to Kuehn). The Kuehn rake includes two rake supporting frames attached to one transport frame. The supporting frames are pivotally attached to the transport frame at the rear end thereof and are supported by a pair of extensible support braces.

While the above cited patents represent improvements and advances in agricultural raking implements, there are several inadequately addressed or unaddressed problems. First, as the cost of raising crops increases, it is of paramount importance to increase the efficiency of agricultural activities. Efficiency can be increased by reducing the number of passes through a field required to gather hay like crops into windrows. Thus, it is an object of the present invention to increase efficiency by providing a rake implement that enables gathering a wider swath of crop material in one pass.

A rake designed to gather wider swaths requires a frame for supporting individual rake components adequately and adjustably, yet without involving a complicated, interengaging plurality of support frame members. Additionally, it would be helpful to be able to control a rake without requiring complicated control or manipulation systems for selecting working positions.

Another difficulty is adequately isolating the rake implement from the irregularities and roughness of the ground or field surface on which it is being used. This problem is compounded by the need to gather the valuavle crop as completely as possible, while providing a means for preventing damage to the rake caused by irregular ground. Thus, it is an object of the present invention to provide an improved wheel rake that increases efficiency and minimizes maintenance cost.

Additional unmet needs include the need for a structurally uncomplicated rake implement so that the owner easily may perform routine maintenance. The implement should be able to be drawn or transported safely and easily to and from fields, along standard highways and through relatively narrow gates and building doors. The implement should be able to be operated conveniently and easily by a minimum number of operational control levers or devices.

It is clear that there is a need for an efficient, simple and durable rake that substantially improves the efficiency of gathering field crops prior to baling them for storage, minimizes maintenance problems and provides for safe, efficient use and transport.

SUMMARY OF THE INVENTION

The rake of the present invention is especially designed for gathering wide swaths of agricultural field crops into windrows prior to baling the crops for storage. The rake broadly includes three components: a primary transport, structural frame, a pair of secondary rake frames and a plurality or bank of radially-tined wheel rakes coupled to the secondary frames. The secondary frames are pivotally coupled to the primary frame by shiftable mounts that allow for adjusting the distance between the two secondary frames. Self-steering support wheels are provided at the distil end of the secondary frames.

A feature of the present invention is the shiftable, pivotable coupling between the primary frame and the secondary frames whereby point loading in the frames and on the coupling is reduced and whereby the secondary frames may move in more than one direction.

Another feature of the present invention is that each secondary frame has a self-steering, ground contacting wheel at its distil end relative to the primary frame. The wheels and the connection between the primary frame and secondary frame allow the individual wheel rakes coupled to the secondary frames to follow the contour of the ground or field, yet control or limit the range of motion to a plane generally parallel to the ground to minimize the possibility of damaging individual wheel rakes or the frames of the rake.

An object of the present invention is to improve the cost efficiency of agricultural field work by providing a simple, durable improved wheel rake. Other objects, features and advantages of the present invention will become more fully apparent and understood with reference to the following specification and appended drawings and claims.

DESCRIPTION OF THE PREFERRED EMBODIMENT

Referring to the drawings, the improved wheel rake 20 of the present invention includes a primary transport frame 22 and right and left side rake banks 24, 26. A tractor T is depicted in phantom.

The primary frame 22 includes two parallel elongated major side beams 28 and forward, middle and rear transverse beams 30, 32, 34. The beams 30, 32, 34 extend transversely between the side beams 28. Angle braces 35 provide additional support between the transverse beams 30, 32, 34 and the side beams 28.

An upstanding post 36 is attached to the midpoint of the rear transverse beam 34. A cross bar 38 is mounted at the top of the post 36. A draw stem 42 is connected to the post 36 and extends rearwardly to a round cross bar 44. The cross bar 44 extends the full width of the main frame 22 between the side beams 28 and is fixed to the inside surface of the beams 28 adjacent the rear ends thereof.

Figure 2:
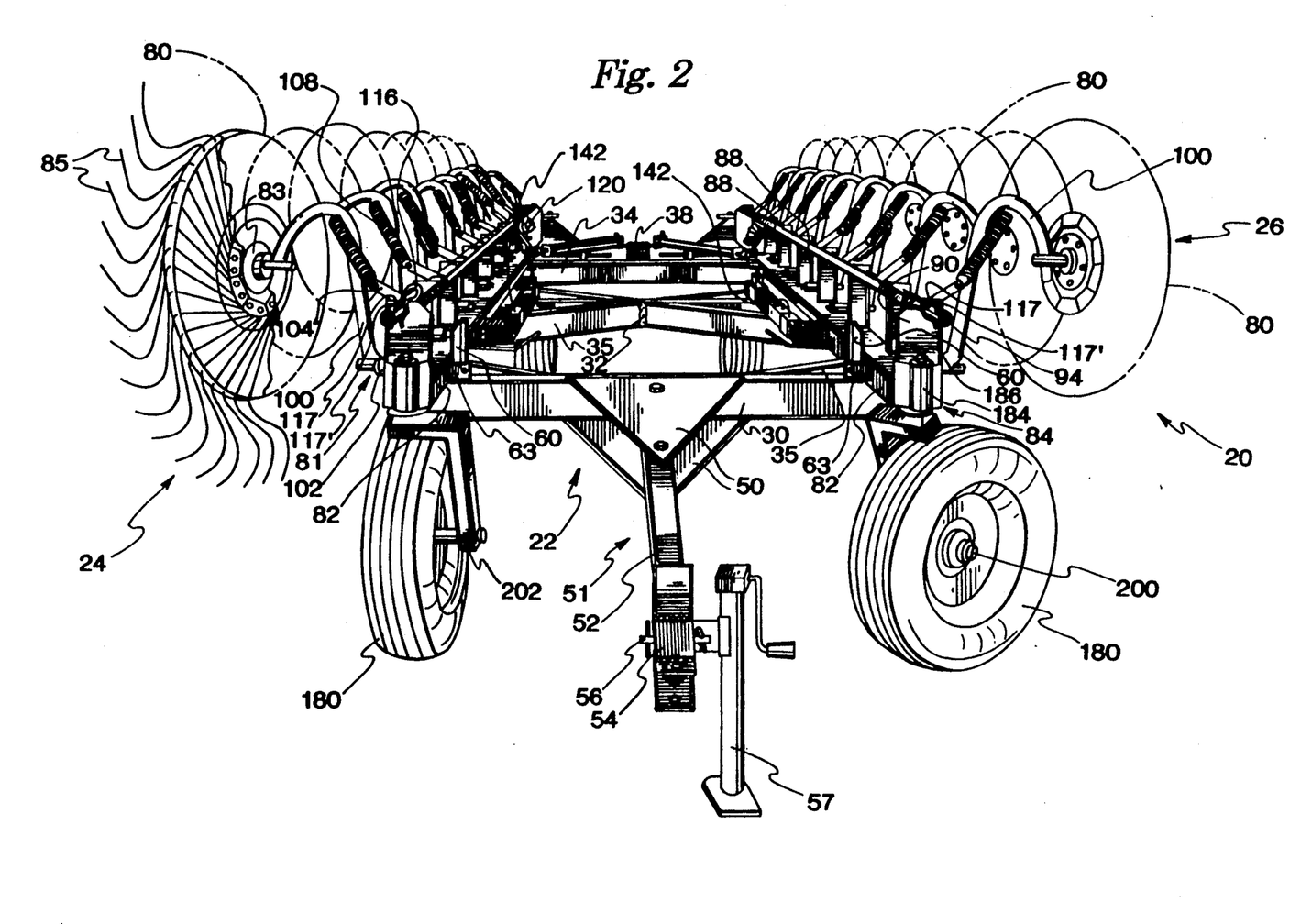
FIG. 2 is a front perspective view depicting the rake, again with portions of individual rakes shown in phantom.

At the opposite or front end of the primary frame 22, depicted in FIG. 2, a pair of upper and lower frame gussets 50 are connected to the forward transverse beam 30. A hitch assembly 51, including a tongue 52, is attached to the frame 22 by gussets 50. The tongue 52 terminates in a hitch 54 having a releasable locking hitch pin 56. A screw jack tongue support 57 is pivotally connected to the tongue 52 for lowering to the support position depicted in FIG. 2.

Figure 9:
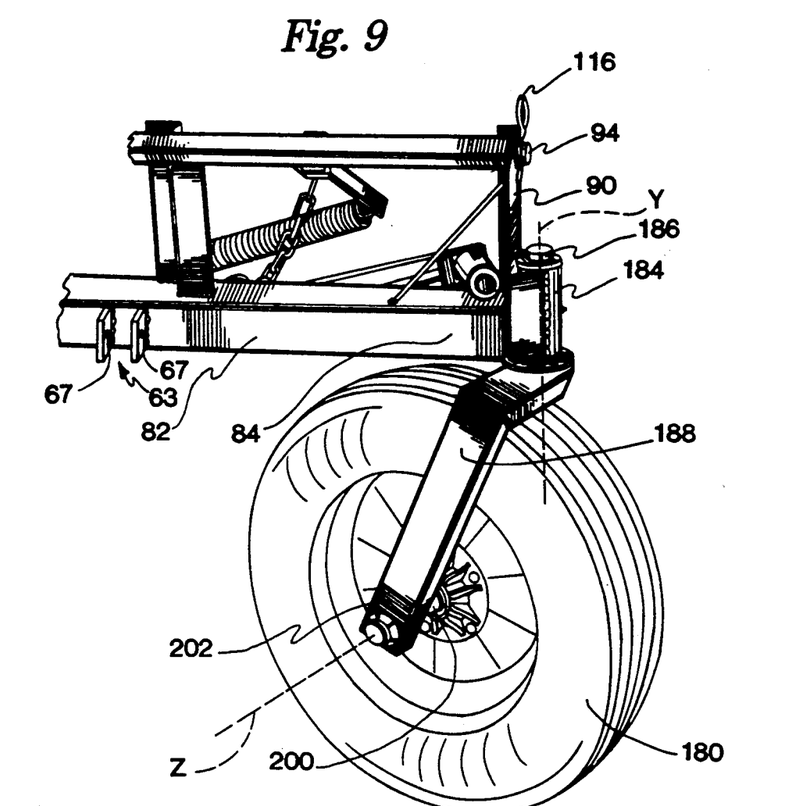
FIG. 9 is a fragmentary perspective view depicting the forward end of the left secondary frame of the rake.
Figure 12:
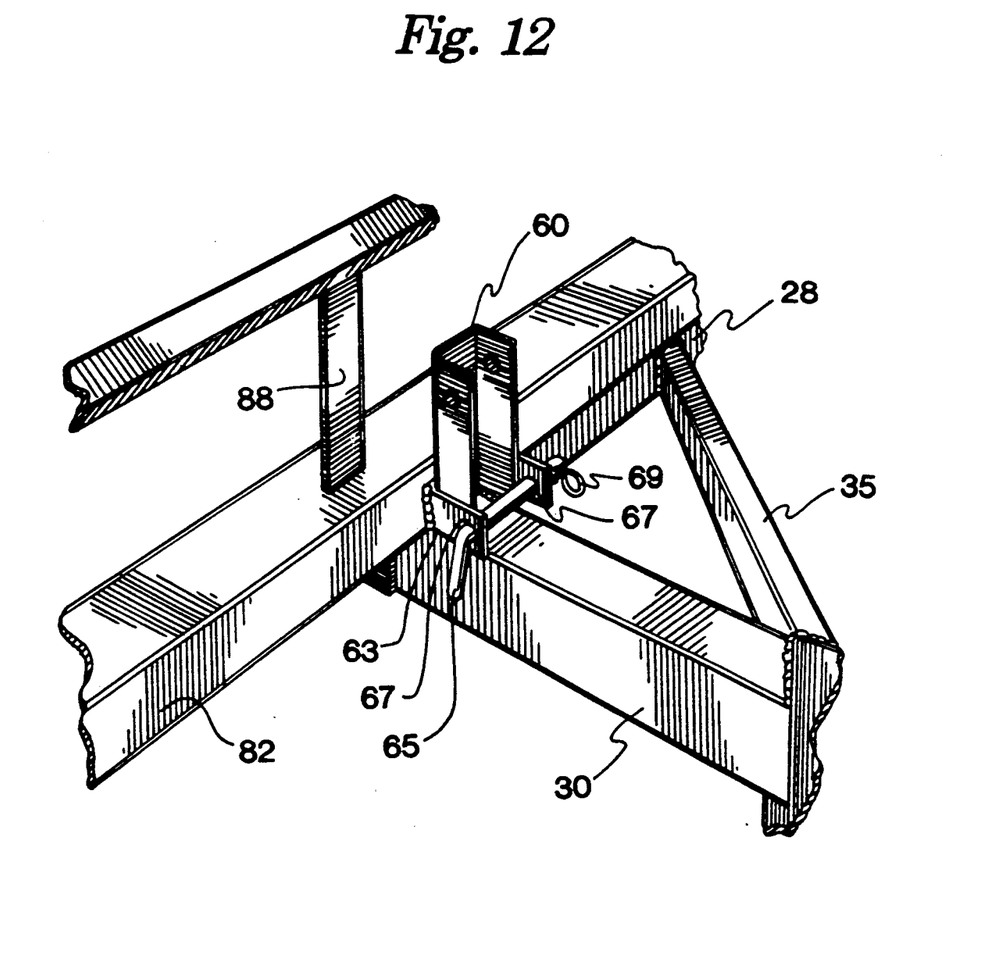
FIG. 12 is a fragmentary, perspective view depicting a bracket and cleat assembly for locking the right secondary frame in the transport position.

Referring to FIGS. 9 and 12, an upstanding transport position securing bracket 60 is provided at each side of forwarding transverse beam 30. A securing cleat 63 mounted on each of the rake banks 24, 26 is receivable by a respective bracket 60. A securing pin 65 is received through apertures 67 in the cleat 63, and is held in place by cotter pin 69.

Figure 10:
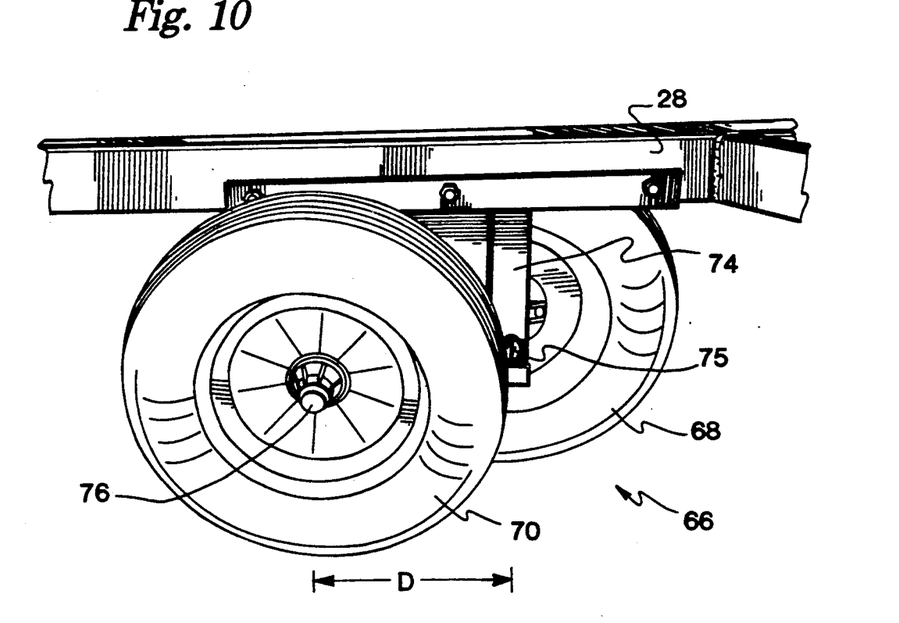
FIG. 10 is a fragmentary side perspective view depicting one of two main frame supporting wheel assemblies.

The primary transport frame 22 is supported by a pair of tandem transport wheel assemblies 66. Referring to FIG. 10, each wheel assembly 66 includes a forward wheel 68 and a rearward wheel 70. The wheels 68, 70 of each assembly are secured to the side beams 28 of the primary frame 22 by a depending wheel mount bracket 74, in a direct, unsuspended connection. The hubs 75, 76 of the transport wheels 68, 70 are offset from each other by a distance D. The offset distance D is approximately equal to the radius of a transport wheel 68, 70 and provides for an expanded effective wheelbase for the transport wheel assemblies 66.

Rake bank 24 is described below, it being understood that both banks 24, 26 are of similar design.

The rake bank 24 includes a plurality of individual wheel rakes 80 supported by a secondary frame assembly 81. The secondary frame assembly 81 includes an elongated rake beam 82 having forward end 84 and rear end 86 pivotally coupled to the primary frame 22. A plurality of upstanding braces 88, including a forward end brace 90 and a rear end brace 92, are spaced at regular intervals along the upper side of the rake beam 82. Rake positioning rod 94 is supported by the upper end of the braces 88, and extends through the forward and rear end braces 90, 92.

Figure 3:
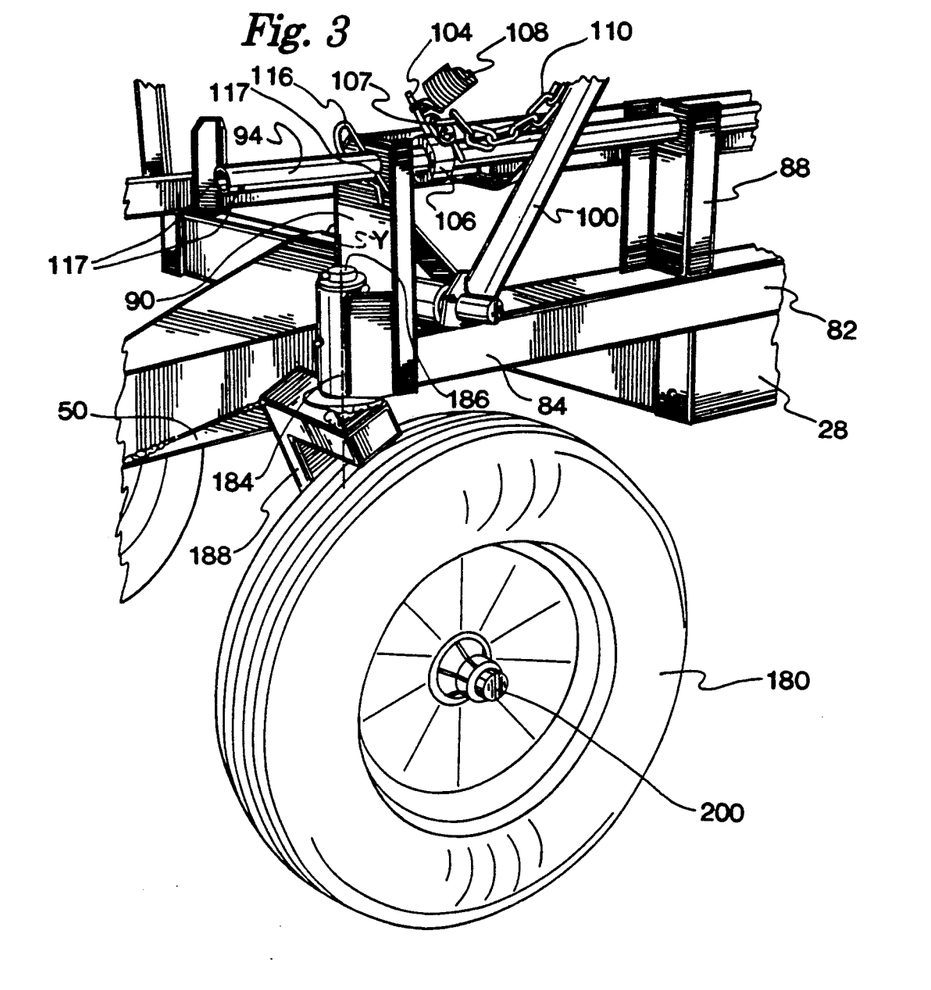
FIG. 3 is a fragmentary perspective depicting the forward end of the left one of the pair of secondary frames of the present invention.
Figures 6, 7:
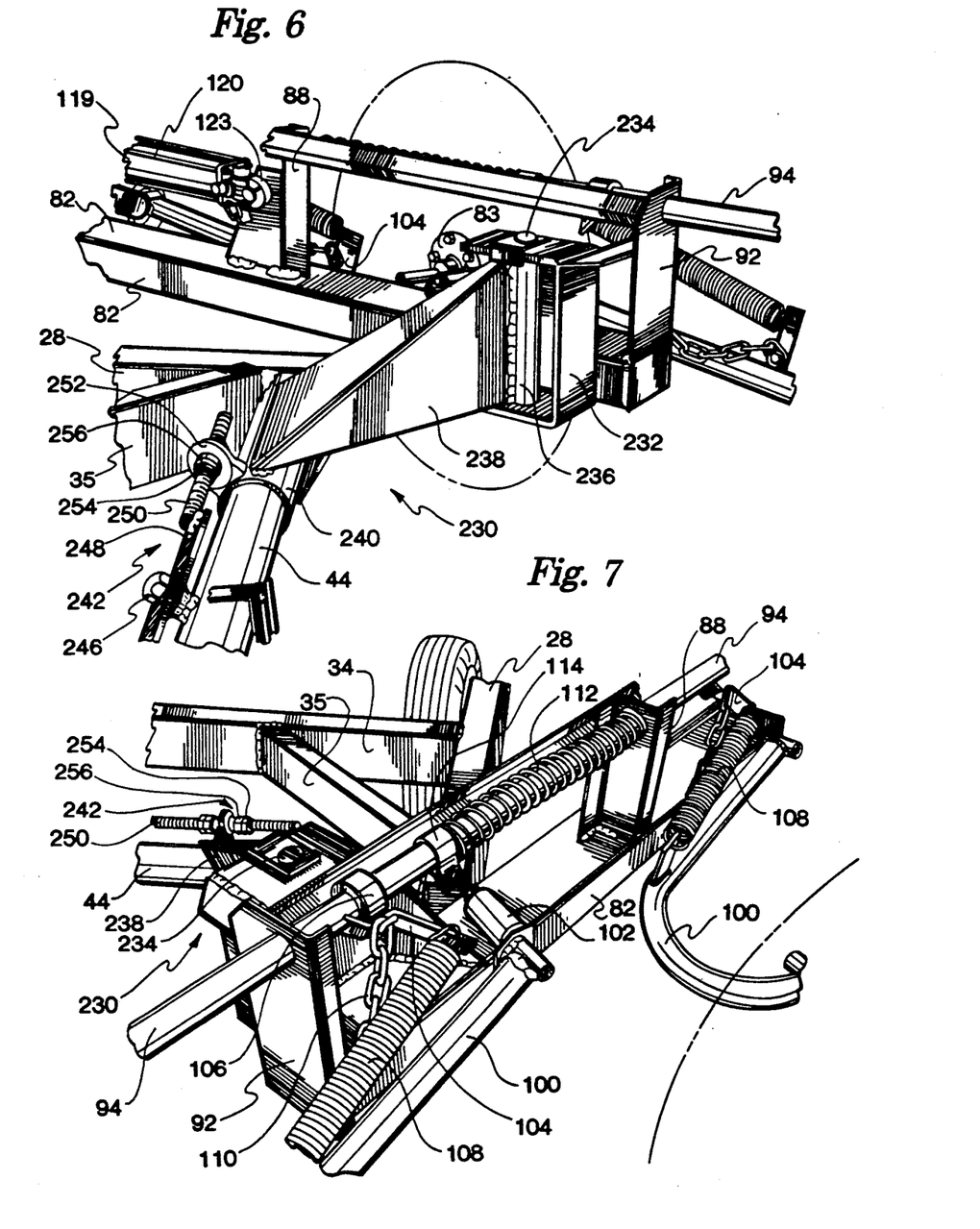
FIG. 6 is a fragmentary perspective view of the present invention depicting the shiftable mount connecting the right secondary frame to the main frame.
FIG. 7 is a fragmentary perspective rear view of the rake depicting additional details of the shiftable mount connecting the right secondary frame to the main frame.

Referring to FIGS. 2, 3 and 7, each wheel rake 80 includes a rake hub 83 and a plurality of radially extending rake tines 85 attached to the hub 83. The rake hubs 83 are mounted on respective rake support arms 100. The rake support arms 100 are pivotally coupled to the beam 82 at rake arm mounts 102. Suspension arms 104 are mounted on collars 106, the collars 106 being secured to the rake position rod 94 by lock nuts 107. A suspension tension spring 108 and a suspension chain 110 are connected between each rake support arm 100 and its respective suspension arm 104.

Referring to FIG. 7, a rake position bias compression spring 112 is carried by the rake position rod 94. One end of the spring 112 abuts one of the upstanding braces 88. A bias compression adjustment collar 114 is fixed to the rake position rod 94 at the opposite end of the spring 112. Rod motion limiting cotter pin 116 is carried within pin receiving apertures 117 at the forward end of the rake position rod 94. The pin 116 may be shifted between transport position apertures 117 and raking position apertures 117'.

Figure 1:
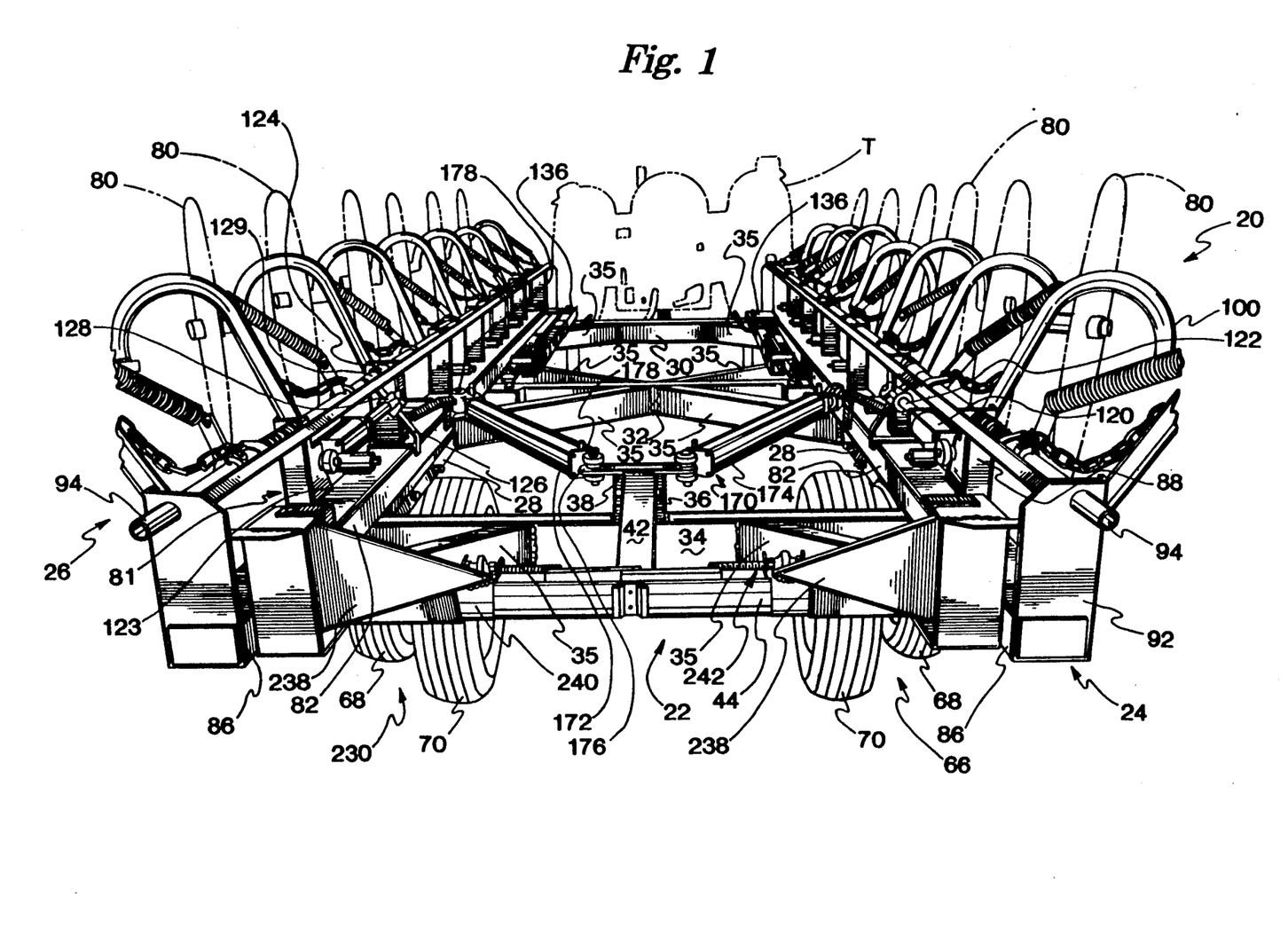
FIG. 1 is a rear perspective view depicting the wheel rake of the present invention with the individual circular, radially tined wheel rakes shown in phantom, the rake being configured in the towed position and being towed by a tractor (shown in phantom)

Referring to FIGS. 1 and 6, wheel rake positioning hydraulic piston and cylinder assembly 119, including cylinder 120 and piston 122, provides for the raising and lowering of the rakes 80 of rake bank 24, with a similar assembly provided for the raising and lowering of the rakes 80 of rake bank 26. The cylinder 120 is pivotally connected to support flange 123 adjacent one of the upstanding braces 88. The piston 122 is coupled to a drive collar 124 carried by the rake position rod 94 via a torque brace 126 and clevis 128. The torque brace 128 is shiftably carried along side beam 82; the drive collar 124 is fixedly positioned on the rake position rod 94 by a tightening nut 129.

Figure 4:
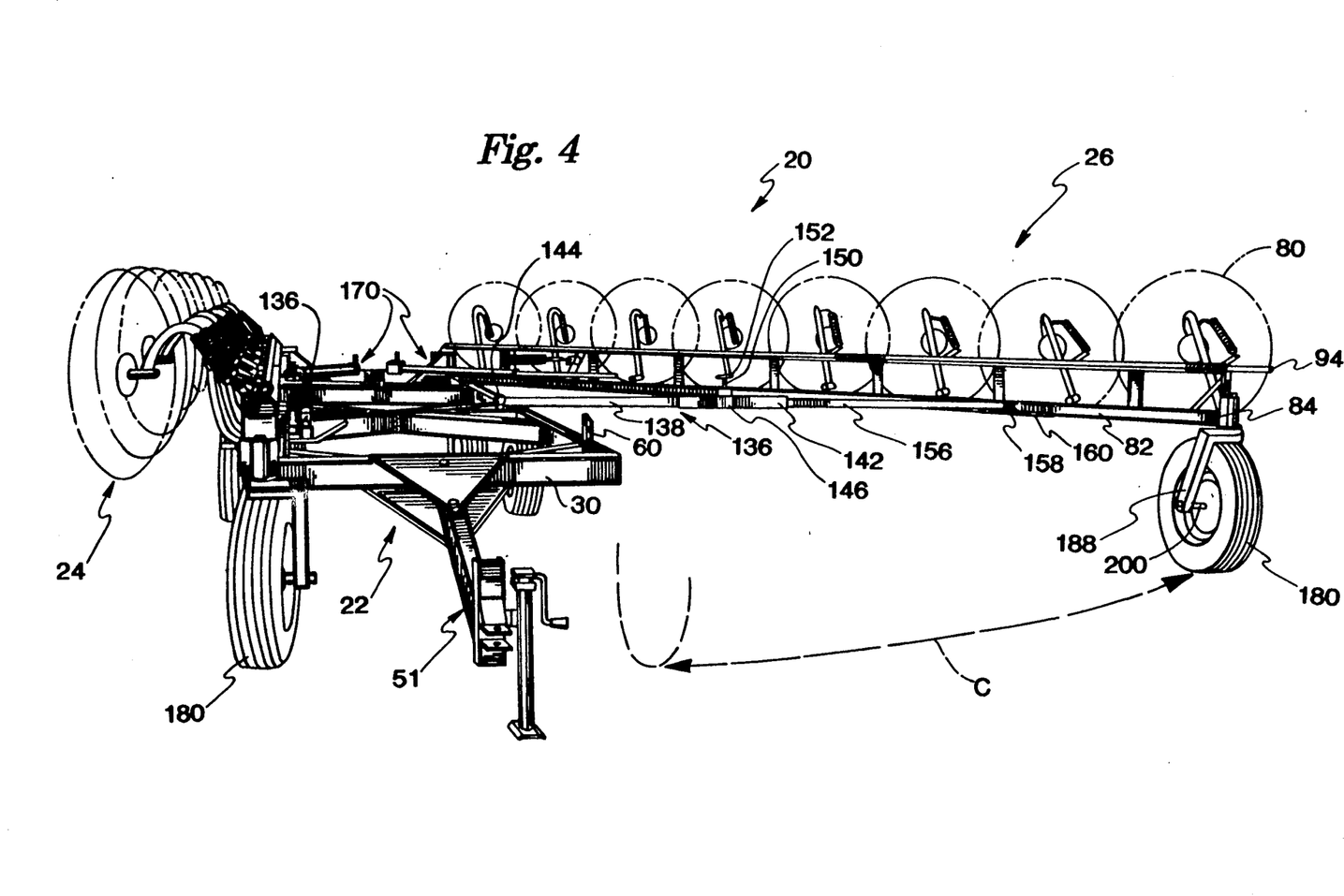
FIG. 4 is a front perspective view of the wheel rake, with one of the two rake banks deployed in the raking position.
Figure 5:
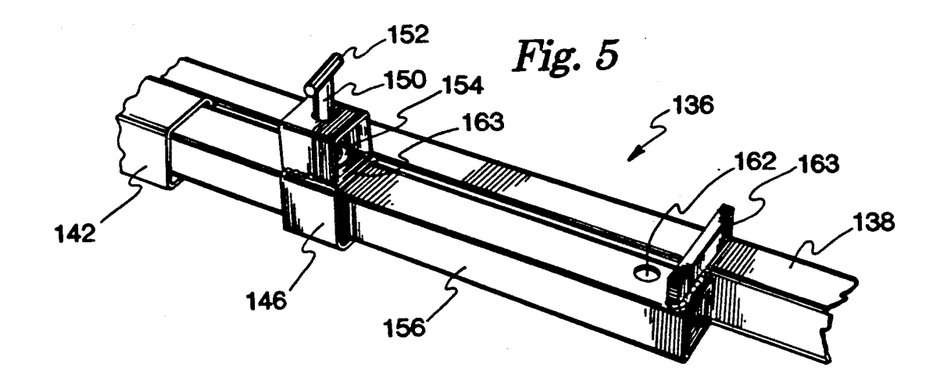
FIG. 5 is a fragmentary perspective view depicting a portion of the extension assembly of the right secondary frame of the present invention.

Referring to FIGS. 4 and 5, each rake bank 24, 26 includes an extension assembly 136 connected between the primary frame 22 and the secondary frames 81. Each extension assembly 136 includes an extension base strut 138 and a square sleeve 142 fixedly attached to the strut 138. The base strut 138 is connected at one end to the primary frame 22 at a wrist mounted ball joint 144. The sleeve 142 is fixed to the strut 138 at the end opposite the connection to the frame 22.

A square extension member 156 is telescopically received in the sleeve 142. The extension member 156 is connected at its outer end to the rake beam 82 at a mounting bracket 158. A stop collar 146 is carried at the opposite end of extension member 156, engageable with the sleeve 142 carried by strut 138 to limit the outward travel of the extension member 156 relative to the strut 138. A stop pin 150 having handle 152 is carried by the collar. Stop pin compression spring 154 biases the pin 150 downwardly. A guide whisker 160 is provided near the bracket 158. The extension member 156 includes a plurality of position selecting stop holes 162 for receiving pin 150 and a top guide 163 that slidably engages the upper surface of strut 138.

Referring to FIG. 1, rake bank spreading assemblies 170 are mounted at the rear end of the primary frame 22. Each assembly 170 includes a piston and cylinder assembly 172 having a cylinder 173 and rod 174. The cylinders 173 are pivotally attached to cross bar 38. The rods 174 are pivotally connected to a respective rake beam 82.

Referring in particular to FIG. 2, self-tending, self-steering bogie support wheels 180 are carried by the rake beams 82 adjacent the forward end 84 of the beams 82. A sleeve 184 is mounted on the forward brace 90. A pivot pin 186, with a generally vertical longitudinal axis of rotation Y, is pivotally received in the sleeve 184. The pin 186 is connected to a rake wheel strut 188. The bogie wheel axle 200 is received at the lower end 202 of the strut 188.

Figure 11:
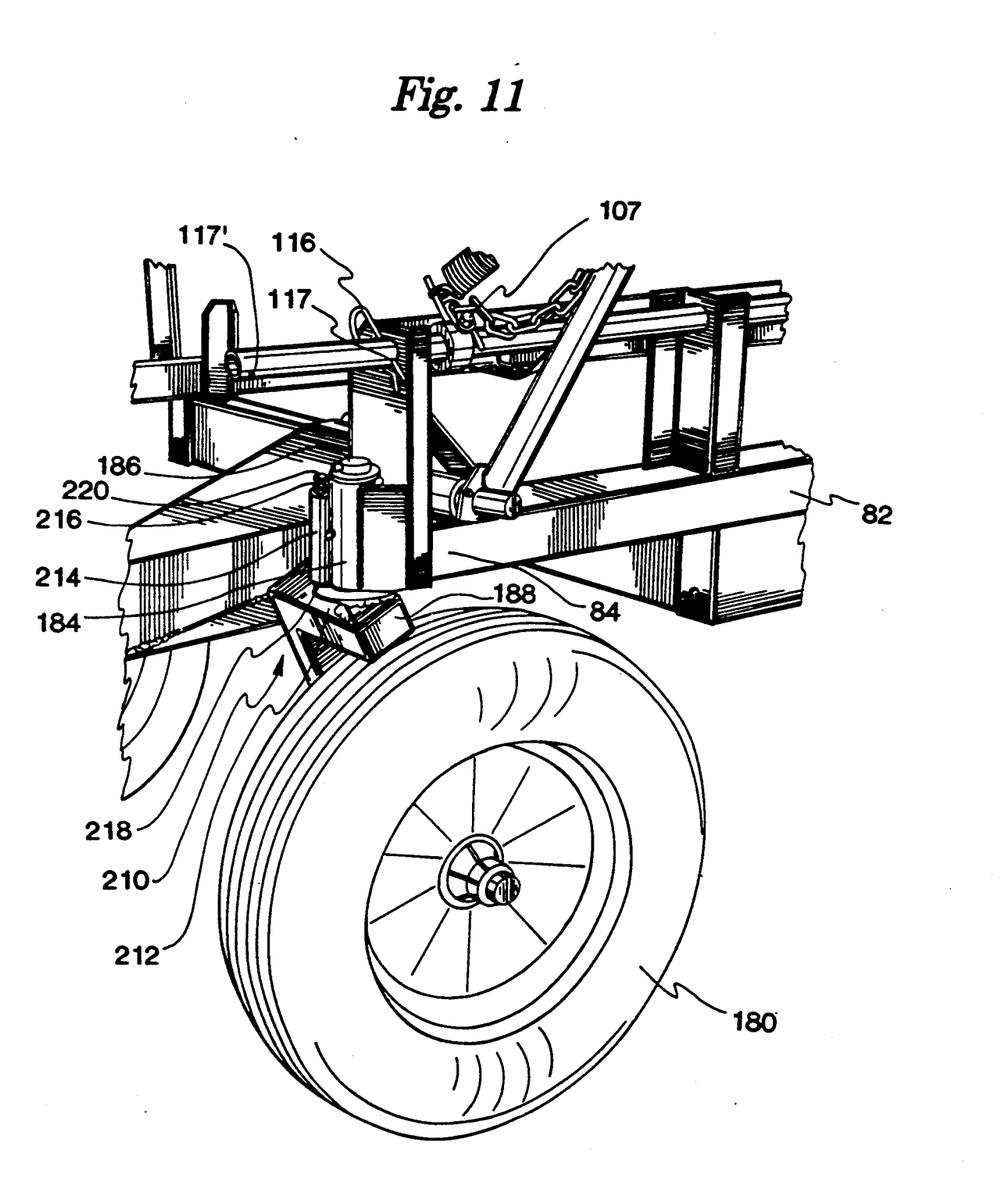
FIG. 11 is a fragmentary perspective view depicting an alternative wheel mount for mounting the secondary frame support wheel.

Referring to FIG. 11, an alternative embodiment for mounting the support wheels 180 includes a brake or damping assembly 210 for each bogie wheel 180. Specifically, a brake disk 212 is attached to the wheel strut 188 at the base of the pin 186. A plunger tube 214, parallel to the pin 186, is connected to the sleeve 184. The plunger tube 214 receives a threaded plunger 216, carrying at its lower end a brake pad 218. A jam nut 220 is threadably connected to the plunger 216 to control the braking friction between the pad 218 and disk 212.

Referring to FIGS. 6 and 7, shiftable joints 230 couple the primary frame 22 with respective right and left rake beams 82. A pivot bracket 232 is fixed to each rake beam 82 adjacent the rear brace 92. The pivot bracket 232 receives a generally vertical beam pivot pin 234. The pin 234 is rotatably received in a gimbal pivot pin housing 236. The gimbal pin housing 236 is fixed at one end of a gimbal support member 238 having a hollow tetrahedral body with four triangular sides. The member 238 has two ends where all four of the triangular areas intersect, the end with the housing 236 and a generally opposite end where a trunnion sleeve 240 is secured. The trunnion sleeve 240 is generally cylindrical and is shiftably carried by the round crossbar 44.

A width adjustment assembly 242 extends between a center bolt 246 carried by the round cross bar 44 and each trunnion sleeve 240. Each width adjustment assembly 242 includes a strut arm 248 directly attached to the center bolt 246 and a threaded rod 250 attached to the end of the strut arm 248. The threaded rod 250 is received in a yoke 252. Jam nuts 254 and operation nuts 256 are threadably received on the rod 250 at both sides of the yoke 252.

In use, the improved wheel rake 20 of the present invention may be towed to and from fields by tractor T with the banks 24, 26, and the wheel rakes 80, in the transport position depicted in FIG. 2. The wheel rakes 80 are maintained in their raised transport position by the abutment of cotter pins 116 with the forward end brace 90. The rake beams 82 are maintained in their folded, transport position by the coupling of rake bank mounted cleats 63 to primary frame mounted brackets 60.

Referring to FIG. 4, the right and left rake banks 24, 26 are swung outwardly by extending the piston and cylinder assemblies 172 of the rake bank spreading assemblies 170. The self-steering bogie wheels 180 will turn in an appropriate direction to provide the minimum amount of resistance as the banks 24, 26 are swung outwardly. Extension member 156 will shift outwardly through sleeve 142 as the respective bank 24, 26 is swung outwardly. Stop pin 150 of collar 145 is prepositioned within a desired one of the stop holes 162 of extension member 156 prior to extension of the bank 24, 26. Abutment of the collar 146 with the sleeve 142 will stop the outward swing of the respective bank 24, 26 at the desired raking angle. Adjustment of the rake bank deployment angle will determine how much crop material is collected in each pass of the rake through the field. The angle of deployment can be minimized when collecting heavy, dense crop material, and expanded to rake wider widths when appropriate.

The width adjustment assembly 242 is used to select the width of the windrow produced by the rake 20 by adjusting the width between the trailing ends of rake banks 24, 26. Jam nuts 254 are released and the operating nuts 256 are turned in the selected direction, moving the trunnion sleeve 240 along the round crossbar 44. Trailing ends of the rake beams 82 are accordingly moved relative to each other. Each sleeve 240 may be moved approximately one-half foot along the crossbar 44, enabling an overall width adjustment of approximately two feet. It will be appreciated that windrow width is also affected by the angle at which the banks 24, 26 are deployed. As the angle is increased, the rear wheel rakes of the banks 24, 26 move closer together. At wide angles of deployment, the width adjustment assembly would be used to spread the rear wheel rakes apart to widen windrow width.

Figure 8:
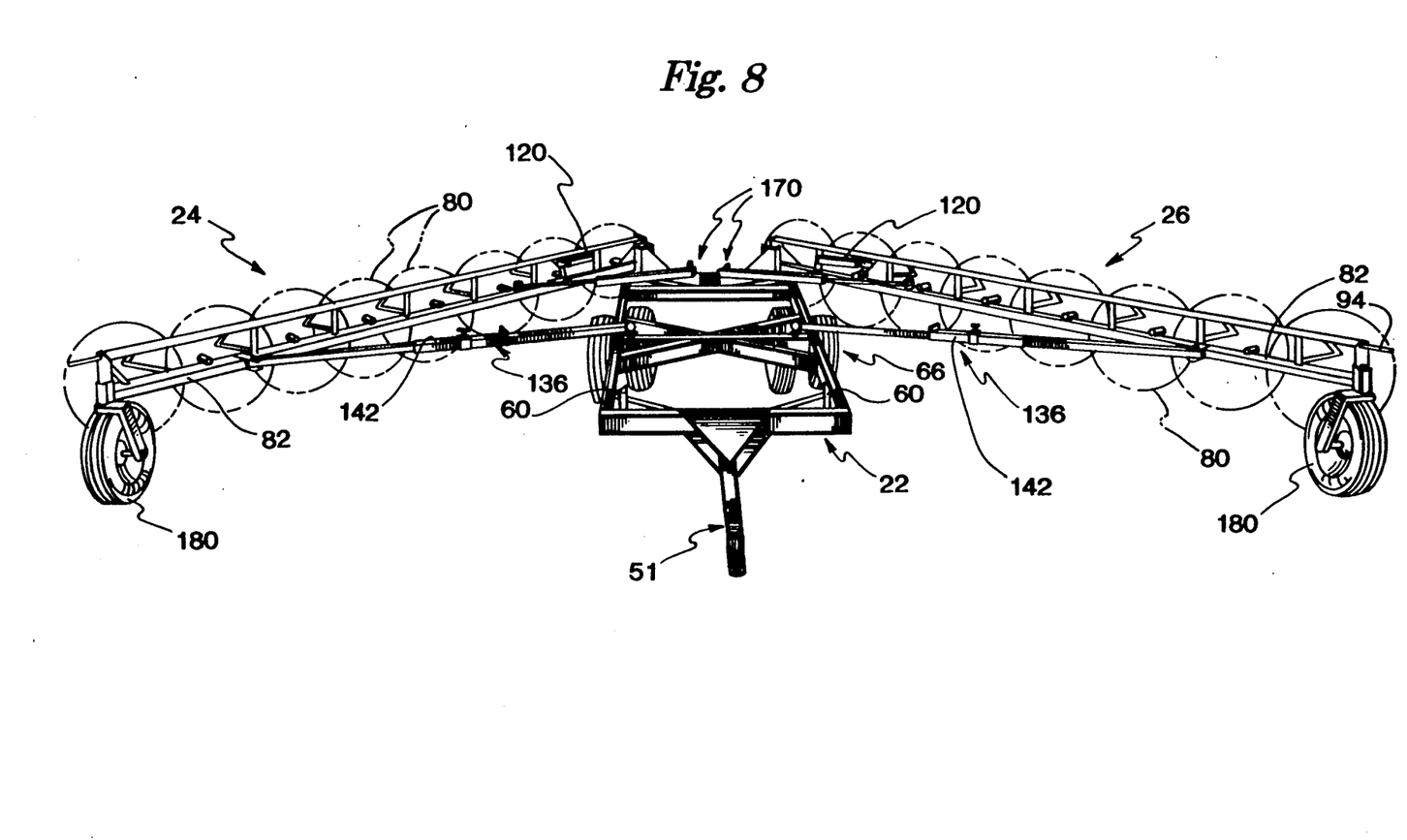
FIG. 8 is a front perspective view of the rake, with both rake banks fully deployed for operation.

The wheel rakes 80 are lowered to the raking position when the rake banks 24, 26 are fully deployed in the configuration depicted in FIG. 8. Cotter pin 116 is first shifted from the position depicted in FIG. 3 to the forward apertures 117'. Piston and cylinder assembly 120 is then retracted (by releasing pressure to the assembly 120), and rake compression spring 112 shifts rake position rod 94 rearwardly (see FIG. 7), allowing the rake support arms to shift downwardly as the suspension arms 104 shift rearwardly. Referring to FIGS. 7 and 9, the suspension arms 104 orient the frame end of tension springs 108 downwardly and away from rake position rod 94 with the rakes in the raking position. The axis of the tension springs 108 are accordingly oriented more or less in parallel with the axes of their respective support arms 100, providing for a desired dampening effect by the springs without undo bouncing of the rakes during operation.

At the conclusion of raking operations, the rakes 80 may be raised by pressurizing the cylinder 120. The spreader assemblies 170 are activated to pull the right and left banks 24, 26 inwardly toward the sides of the primary main frame 22. The banks 24, 26 are secured in the transport position by the coupling of cleats 63 to their respective bracket 60 with pin 65.

Whether during transportation to a field or during raking operations, the lengthened effective wheelbase of the wheel assemblies 66 modulates rough, irregular surface conditions and minimizes the chance of individual wheels becoming trapped in a rut.

As the rake 20 is being towed, the self-tending bogie wheels 180 will follow the lead of the towing vehicle. That is, an imaginary line connecting the bottom end of the pin 186 and the wheel rotation axis Z will be angled from vertical because the generally vertical sleeve axis, represented by line Y in FIG. 9, is forward or ahead of the wheel rotation axis, represented by line Z in FIG. 9. This forward tilt or rake of the strut 188 causes the wheel to respond to vertical loading, following the direction of a turn. The braking or damping assembly 210 depicted in FIG. 11 may be adjusted to vary the degree of self-steer of the bogie wheels 180 if higher speed transportation is anticipated.

The gimbal joint 230 between the rake banks 24, 26 and the primary frame 22 (specifically, between the rake beams 82 and the primary frame 22) enables the rear end of each rake bank 24, 26 to move vertically. The gimbal joints 230 displace or lift the rake beams 82 above and rearwardly relative to the side beams 28 of the primary frame 22. The banks 24, 26 are moveable in a horizontal plane around the generally vertical axis of the beam pivot pin 234 in the pin housing 236, and are moveable in a vertical plane around the generally horizontal axis of the round crossbar 44 in the trunnion sleeve 240. Thus, the rake banks 24, 26 have a range or degree of motion in at least two orientations or directions and each entire bank 24, 26 independently follows the contour of the land and floats relative to the primary frame 22.

What is claimed and desired to be protected by Letters Patent is:

1. An agricultural implement comprising:
   a primary frame having a front end, a rear end and opposed sides;
   a secondary frame operably supporting a bank of ground driven wheel rakes;
   joint means for operably, pivotally coupling said secondary frame to said primary frame;
   extension means operably coupling said secondary frame to said primary frame for shifting said secondary frame between a folded, transport position and an extended, raking position wherein said secondary frame is oriented at a raking angle relative to said primary frame; and
   positioning means operably carried by said extension means for selectively positioning said secondary frame at one of a plurality of raking angles,
   said extension means comprising a telescoping member shiftable between a collapsed configuration and an extended configuration, said telescoping member operably extending between said primary frame and said secondary frame, said positioning means comprising adjustable stop means operably coupled to said telescoping member for determining the length of said telescoping member when in said extended configuration.

2. The invention as claimed in claim 1, said telescoping member comprising a sleeve and an elongated extensible member slidably received within said sleeve, said adjustable stop means comprising collar means operably carried by said extensible member for operably abutably engaging said sleeve thereby limiting the range of extension of said extensible member through said sleeve.

3. The invention as claimed in claim 2, said extensible member including structure defining a plurality of pin receiving apertures along the length of said extensible member, said collar means including a collar element and a retractable pin element operably carried by said collar element, said pin element being selectively shiftable between predetermined ones of said apertures for positioning said collar at predetermined positions along said extensible member.

4. An agricultural implement comprising:
   a primary frame having a front end, a rear end and opposed sides;
   a secondary frame comprising an elongated beam operably supporting a bank of ground driven wheel rakes, said beam having a proximal end operably coupled to said primary support frame and an opposed, distal end;
   joint means for operably, pivotally coupling said secondary frame proximal end to said primary frame;
   a ground engaging support wheel operably coupled to said distal end of said beam;
   castor means operably coupling said ground engaging support wheel to said beam for rotation of said ground engaging support wheel about a generally vertical axis of rotation; and
   brake means operably coupled to said castor means for controlling the ease of rotation of said ground engaging support wheel about said generally vertical axis of rotation.

5. The invention as claimed in claim 4, said brake means comprising a brake disk element operably carried by said ground engaging wheel, and a threaded plunger operably, adjustably engageable with said disk element.

6. An agricultural implement comprising:
   a primary frame having a front end, a rear end and opposed sides;
   a secondary frame operably supporting a bank of ground driven wheel rakes;
   joint means for operably, pivotally coupling said secondary frame to said primary frame; and
   generally rearwardly extending rake support arms operably, pivotally coupling said wheel rakes to said secondary frame, and tension spring means oriented generally parallel to said rake support arms.

7. The invention as claimed in claim 6, each of said rake support arms being operably coupled to said secondary frame at a respective pivot axis, said tension spring means comprising individual spring assemblies operably coupled to each of said rake support arms, each of said spring assemblies including a spring operably coupled between a respective support arm at a point rearwardly of its pivot axis and said secondary frame.

8. The invention as claimed in claim 7, each of said spring assemblies including a spring suspension arm element operably coupling its respective spring to said secondary frame for orienting said spring generally parallel to its respective rake support arm.

9. An agricultural implement comprising:
 a primary frame having a front end, a rear end and opposed sides;
 a secondary frame operably supporting a bank of ground driven wheel rakes;
 joint means for operably, pivotally coupling said secondary frame to said primary frame;
 a pair of ground engaging wheel assemblies operably carried by said primary frame, each of said wheel assemblies including a pair of wheels, said wheels each defining a wheel axis of rotation and the axis of rotation of one of said wheels in each wheel assembly being rearwardly offset from the other of said wheels in each assembly.

10. The invention as claimed in claim 9, said offset being equal to about the radius of said wheels.

* * * * *